(12) United States Patent
Lan et al.

(10) Patent No.: US 12,520,592 B2
(45) Date of Patent: Jan. 6, 2026

(54) WIRING STRUCTURE OF ELECTRONIC DEVICE

(71) Applicant: InnoLux Corporation, Miao-Li County (TW)

(72) Inventors: Jia-Yan Lan, Miao-Li County (TW); Shih-Ta Wen, Miao-Li County (TW); Jian-Ming Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 415 days.

(21) Appl. No.: 18/164,005

(22) Filed: Feb. 3, 2023

(65) Prior Publication Data

US 2023/0299091 A1 Sep. 21, 2023

(30) Foreign Application Priority Data

Mar. 15, 2022 (CN) .................. 202210250413.X (51) Int. Cl.
*H10D 86/60* (2025.01)
*G06F 3/041* (2006.01)
(Continued)

(52) U.S. Cl.
CPC .......... *H10D 86/60* (2025.01); *G06F 3/0412* (2013.01); *H01L 24/05* (2013.01); *H01L 24/06* (2013.01); *H10D 86/441* (2025.01); *H01L 2224/05573* (2013.01); *H01L 2224/06152* (2013.01); *H01L 2224/06155* (2013.01)

(58) Field of Classification Search
CPC ............... G06V 40/1318; G06V 10/94; G06V 40/1306; H04M 1/0266; G06F 3/0412; G06F 3/04166; G06F 3/047; G06F 3/04164; H10D 86/441; H10D 86/60; H10N 30/802
See application file for complete search history.

(56) References Cited

U.S. PATENT DOCUMENTS

| 10,600,812 B2 | 3/2020 | Hsu et al. | |
|---|---|---|---|
| 2003/0035081 A1* | 2/2003 | Jung | G02F 1/1345 349/152 |

(Continued)

FOREIGN PATENT DOCUMENTS

CN 108873508 A 11/2018

*Primary Examiner* — Brian Turner
(74) *Attorney, Agent, or Firm* — McClure, Qualey & Rodack, LLP (57) ABSTRACT

An electronic device is provided. The electronic device includes a substrate, a plurality of first pads, a plurality of second pads, a first data line and a touch signal line. The substrate has a first bonding area and a second bonding area. The first pads are disposed in the first bonding area and arranged along a first direction. The second pads are disposed in the second bonding area and arranged along a second direction. There is an included angle between the first direction and the second direction. The first data line is disposed on the substrate and electrically connected to at least one of the first pads or the second pads. The touch signal line is disposed on the substrate and electrically connected to at least another one of the first pads or the second pads. The first data line at least partially overlaps the touch signal line.

17 Claims, 7 Drawing Sheets

(51) Int. Cl.
*H01L 23/00* (2006.01)
*H10D 86/40* (2025.01)

(56) References Cited

U.S. PATENT DOCUMENTS

| | | | |
|---|---|---|---|
| 2018/0166037 A1* | 6/2018 | Lee | H10D 86/40 |
| 2019/0130861 A1* | 5/2019 | Xing | H10D 86/60 |
| 2019/0182948 A1* | 6/2019 | Kim | G02F 1/136286 |
| 2019/0259824 A1* | 8/2019 | Cho | H10K 77/111 |
| 2021/0157429 A1* | 5/2021 | Wu | G06V 40/1318 |
| 2021/0408060 A1* | 12/2021 | Ji | G09G 3/3648 |
| 2022/0005915 A1* | 1/2022 | Kim | G02F 1/13454 |

* cited by examiner

WIRING STRUCTURE OF ELECTRONIC DEVICE

CROSS REFERENCE TO RELATED APPLICATIONS

This application claims the benefit of China Application No. 202210250413.X, filed Mar. 15, 2022, the entirety of which is incorporated by reference herein.

BACKGROUND

Technical Field

The present disclosure is related to an electronic device, and in particular it is related to a wiring structure design of an electronic device.

Description of the Related Art

Electronic products including display panels, such as tablet computers, notebook computers, smartphones, displays and televisions, have become indispensable necessities in modern society. With the rapid development of these portable electronics, consumers have high expectations on their quality, functionality, or price.

In recent years, the display panel has been developing towards a narrow-frame design that reduces the area of the peripheral region of the array substrate. The configuration of the wiring of the fan-out area in the peripheral region is one of the key factors affecting the area of the peripheral region. The development of a wiring structure design that can further reduce the area of the peripheral region of the electronic device is still one of the current research topics in the industry.

SUMMARY

In accordance with some embodiments of the present disclosure, an electronic device is provided. The electronic device includes a substrate, a plurality of first pads, a plurality of second pads, a first data line and a touch signal line. The substrate has a first bonding area and a second bonding area. The plurality of first pads are disposed in the first bonding area and arranged along a first direction. The plurality of second pads are disposed in the second bonding area and arranged along a second direction. There is an included angle between the first direction and the second direction. The first data line is disposed on the substrate and electrically connected to at least one of the plurality of first pads or the plurality of second pads. The touch signal line is disposed on the substrate and electrically connected to at least another one of the plurality of first pads or the plurality of second pads. The first data line at least partially overlaps the touch signal line.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

The electronic device according to the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. These embodiments are used merely for the purpose of illustration, and the present disclosure is not limited thereto. In addition, different embodiments may use like and/or corresponding numerals to denote like and/or corresponding elements in order to clearly describe the present disclosure. However, the use of like and/or corresponding numerals of different embodiments does not suggest any correlation between different embodiments.

It should be understood that relative expressions may be used in the embodiments. For example, "lower", "bottom", "higher" or "top" are used to describe the position of one element relative to another. It should be appreciated that if a device is flipped upside down, an element that is "lower" will become an element that is "higher". The present disclosure can be understood by referring to the following detailed description in connection with the accompanying drawings. The drawings are also regarded as part of the description of the present disclosure. It should be understood that the drawings of the present disclosure may be not drawn to scale. In fact, the size of the elements may be arbitrarily enlarged or reduced to clearly represent the features of the present disclosure.

Furthermore, the expression "a first material layer is disposed on or over a second material layer" may indicate that the first material layer is in direct contact with the second material layer, or it may indicate that the first material layer is in indirect contact with the second material layer. In the situation where the first material layer is in indirect contact with the second material layer, there may be one or more intermediate layers between the first material layer and the second material layer. However, the expression "the first material layer is directly disposed on or over the second material layer" means that the first material layer is in direct contact with the second material layer, and there is no intermediate element or layer between the first material layer and the second material layer.

Moreover, it should be understood that the ordinal numbers used in the specification and claims, such as the terms "first", "second", etc., are used to modify an element, which itself does not mean and represent that the element (or elements) has any previous ordinal number, and does not mean the order of a certain element and another element, or the order in the manufacturing method. The use of these ordinal numbers is to make an element with a certain name can be clearly distinguished from another element with the same name. Claims and the specification may not use the same terms. For example, the first element in the specification may refer to the second element in the claims.

In accordance with the embodiments of the present disclosure, regarding the terms such as "connected to", "interconnected with", etc. referring to bonding and connection, unless specifically defined, these terms mean that two structures are in direct contact or two structures are not in direct contact, and other structures are provided to be disposed between the two structures. The terms for bonding and connecting may also include the case where both structures are movable or both structures are fixed. In addition, the term "electrically connected to" or "electrically coupled to" may include any direct or indirect electrical connection means.

In the following descriptions, terms "about" and "substantially" typically mean+/−10% of the stated value, or typically +/−5% of the stated value, or typically +/−3% of the stated value, or typically +/−2% of the stated value, or typically +/−1% of the stated value or typically +/−0.5% of the stated value. The expression "in a range from the first value to the second value" or "between the first value and the second value" means that the range includes the first value, the second value, and other values in between.

It should be understood that in the following embodiments, without departing from the spirit of the present disclosure, the features in several different embodiments can be replaced, recombined, and mixed to complete another embodiment. The features between the various embodiments can be mixed and matched arbitrarily as long as they do not violate or conflict the spirit of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with the embodiments of the present disclosure, an electronic device is provided, which has data lines and touch signal lines configured in a specific wiring manner. For example, by rearranging pads, overlapping data lines and touch signal lines, etc., the numbers of the data lines and the touch signal lines are respectively matched with the pixels, so as to reduce the wiring configuration area of the fan-out area, thereby reducing the area of the peripheral region, and realizing the narrow frame design of the electronic device.

In accordance with the embodiments of the present disclosure, the electronic device may include a display device, a sensing device or a tiled device, but it is not limited thereto. The electronic device may be a bendable or flexible electronic device. The display device may be a non-self-luminous display device or a self-luminous display device. The sensing device may be a sensing device for sensing capacitance, light, heat or ultrasonic, but it is not limited thereto. The electronic device may include electronic components. The electronic components may include passive components and active components, such as capacitors, resistors, inductors, diodes, transistors, and the like. The diodes may include light-emitting diodes or photodiodes. The light-emitting diodes may, for example, include organic light-emitting diodes (OLEDs), mini light-emitting diodes (mini LEDs), micro light-emitting diodes (micro LEDs) or quantum dot light-emitting diodes (quantum dot LEDs), but it is not limited to. The tiled device may be, for example, a display tiled device or an antenna tiled device, but it is not limited thereto. It should be noted that the electronic device can be any combination and arrangement of the aforementioned, but it is not limited thereto. In the following description, a display device is used as an example of an electronic device to illustrate the content of the present disclosure, but the present disclosure is not limited thereto.

Figure 1:
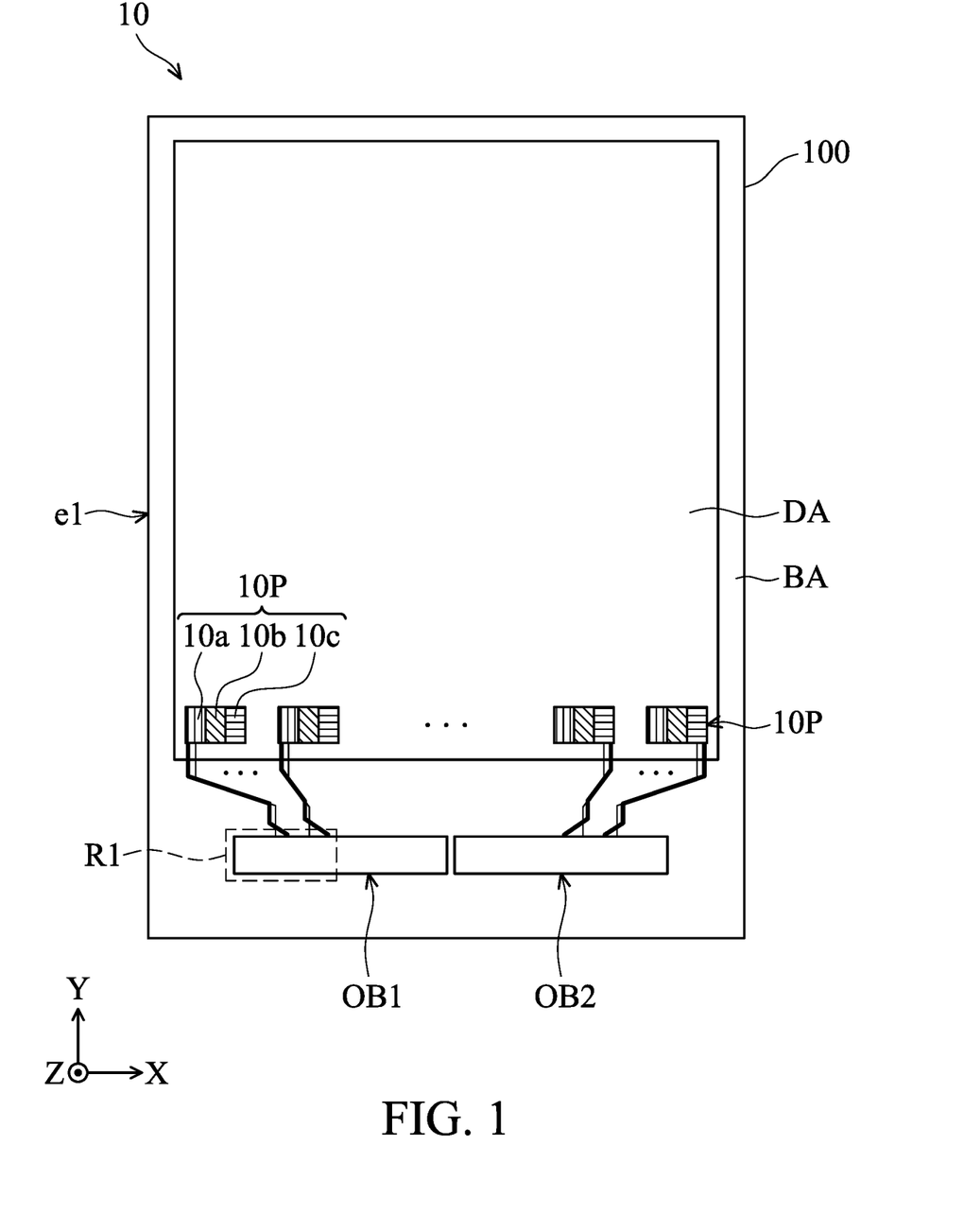
FIG. 1 is a top-view diagram of an electronic device in accordance with some embodiments of the present disclosure.

Refer to FIG. 1, which is a top-view diagram of an electronic device 10 in accordance with some embodiments of the present disclosure. It should be understood that, some elements of the electronic device 10 are omitted in the drawings of the present disclosure for clarity, and only some elements are schematically shown. In accordance with some embodiments, additional features may be added to the electronic device 10 described below. In accordance with some other embodiments, some features of the electronic device described below may be replaced or omitted.

The electronic device 10 may include a substrate 100. The substrate 100 may have a display region DA and a peripheral region BA, and the peripheral region BA may surround the display region DA. In accordance with some embodiments, the substrate 100 may have a first bonding area OB1 and a second bonding area OB2, and the first bonding area OB1 and the second bonding area OB2 may be disposed in the peripheral region BA. The first bonding area OB1 and the second bonding area OB2 may be areas where the signal lines are bonded to other electronic components. In accordance with some embodiments, other electronic components may include integrated circuits (ICs), microchips, or other suitable electronic components that can provide electronic signals or logic signals, but they are not limited thereto.

Specifically, the substrate 100 may serve as a driving substrate, and a driving circuit (not illustrated) may be disposed on the substrate 100. The driving circuit may include an active driving circuit and/or a passive driving circuit. In accordance with some embodiments, the driving circuit may include thin-film transistors (TFTs) (for example, switching transistors, driving transistors, reset transistors, or other thin-film transistors), data lines, scanning lines, touch signal lines, conductive pads, dielectric layers, capacitors or other lines, etc., but it is not limited thereto. In addition, the thin-film transistor may be a top gate thin-film transistor, a bottom gate thin-film transistor, or a dual gate (double gate) thin-film transistor. The thin-film transistor may include at least one semiconductor layer, and the semiconductor layer may include, but is not limited to, amorphous silicon, low-temp polysilicon (LTPS), metal oxide, another suitable material, or a combination thereof. The metal oxide may include indium gallium zinc oxide (IGZO), indium zinc oxide (IZO), indium gallium zinc tin oxide (IGZTO), and another suitable material, or a combination thereof, but it is not limited thereto.

Furthermore, the substrate 100 may include a rigid substrate or a flexible substrate. In accordance with some embodiments, the material of the substrate 100 may include glass, quartz, sapphire, polyimide (PI), polycarbonate (PC), polyethylene terephthalate (PET), polydimethylsiloxane (PDMS), another suitable material or a combination thereof, but it is not limited thereto. In accordance with some embodiments, the substrate 100 may include a flexible printed circuit (FPC).

In addition, the electronic device 10 may include a plurality of pixels 10P, the pixels 10P may be disposed in the display region DA, and the pixels 10P may be electrically connected to the first bonding area OB1 or the second bonding area OB2 through signal lines. In accordance with some embodiments, the pixel 10P may have a plurality of sub-pixels, for example, a sub-pixel 10a, a sub-pixel 10b, and a sub-pixel 10c. In accordance with some embodiments, the sub-pixel 10a, the sub-pixel 10b and the sub-pixel 10c may be a red sub-pixel, a green sub-pixel and a blue sub-pixel respectively, but it is not limited thereto.

In accordance with some embodiments, one sub-pixel may correspond to one light-emitting unit, and the light-emitting unit may be a light-emitting diode (LED), for example, including a micro-LED, a mini light-emitting diode (mini-LED), an organic light-emitting diode (OLED), an inorganic light-emitting diode, or quantum dot light-emitting diode (QLED, QDLED), but it is not limited thereto.

It should be understood that although the electronic device 10 has two bonding areas in the embodiment shown in the drawings, the present disclosure is not limited thereto. The electronic device 10 may have other suitable numbers of bonding areas according to different wiring designs. Similarly, although one pixel 10P has three sub-pixels in the embodiment shown in the drawings, the present disclosure is not limited thereto. According to different embodiments, a pixel may have other suitable numbers or colors of sub-pixels.

Figure 2:
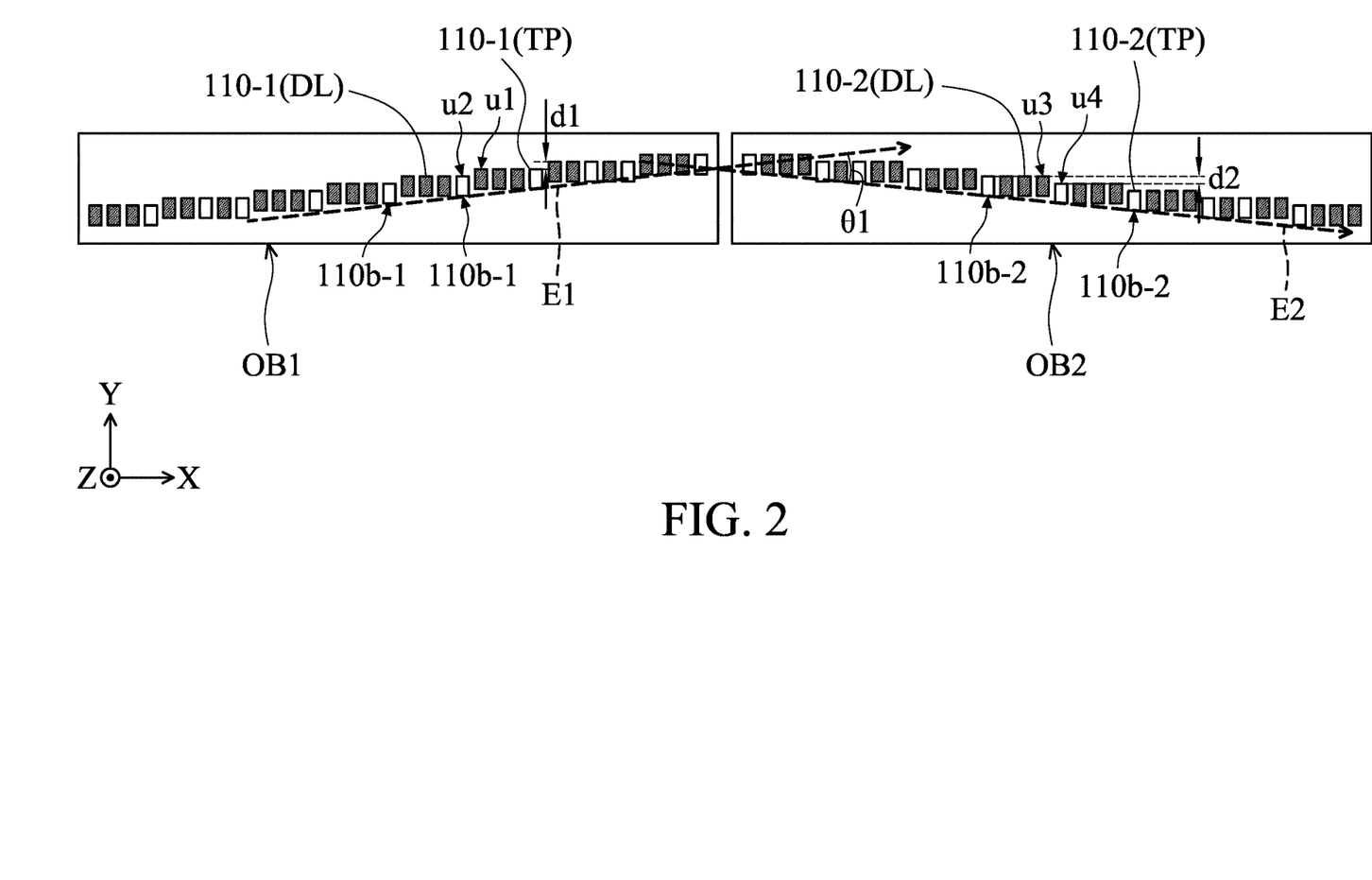
FIG. 2 is a top-view diagram of a partial structure of an electronic device in accordance with some embodiments of the present disclosure.

Next, refer to FIG. 2, which is a top-view diagram of a partial structure of the electronic device 10 in accordance with some embodiments of the present disclosure. Specifically, FIG. 2 shows a top-view diagram of the first bonding area OB1 and the second bonding area OB2 of the electronic device 10. It should be understood that FIG. 2 only shows the pads disposed in the first bonding area OB1 and the second bonding area OB2 to clearly illustrate their arrangement aspects.

As shown in FIG. 2, the electronic device 10 may have a plurality of first pads 110-1 and a plurality of second pads 110-2. The first pads 110-1 may be disposed in the first bonding area OB1 and arranged along a first direction E1. The second pads 110-2 may be disposed in the second bonding area OB2 and arranged along a second direction E2. In addition, an angle θ1 is between the first direction E1 and the second direction E2. In accordance with some embodiments, the angle θ1 between the first direction E1 and the second direction E2 is between about 0 degrees and about 45 degrees (0 degrees≤angle θ1≤45 degrees). In other words, the first pads 110-1 and the second pads 110-2 may be arranged in a non-horizontal manner (e.g., not along the X direction in the drawing), for example, arranged in a manner of gradually rising upward or descending downward.

In accordance with the embodiments of the present disclosure, the first direction E1 refers to the extending direction of the connection line of the lower edges of the plurality (at least two) of the first pads 110-1. For example, the first direction E1 may be the extending direction of the connection line of the lower edges 110b-1 of the first pads 110-1 that are electrically connected to the touch signal line TP. In accordance with the embodiments of the present disclosure, the second direction E2 refers to the extending direction of the connection line of the lower edges of the plurality (at least two) of the second pads 110-2. For example, the second direction E2 may be the extending direction of the connection line between the lower edges 110b-2 of the second pads 110-2 that are electrically connected to the touch signal line TP.

Furthermore, in accordance with some embodiments, the material of the first pad 110-1 and the second pad 110-2 may include a metal material, such as copper (Cu), aluminum (Al), molybdenum (Mo), indium (In), ruthenium (Ru), tin (Sn), gold (Au), platinum (Pt), zinc (Zn), silver (Ag), titanium (Ti), lead (Pb), nickel (Ni), neodymium (Nd), iridium (Ir), chromium (Cr), magnesium (Mg), palladium (Pd), lithium (Li), alloys of the foregoing metals, another suitable metal material or a combination thereof, but it is not limited thereto. Moreover, the material of the first pad 110-1 may be the same as or different from that of the second pad 110-2.

Figure 3A:
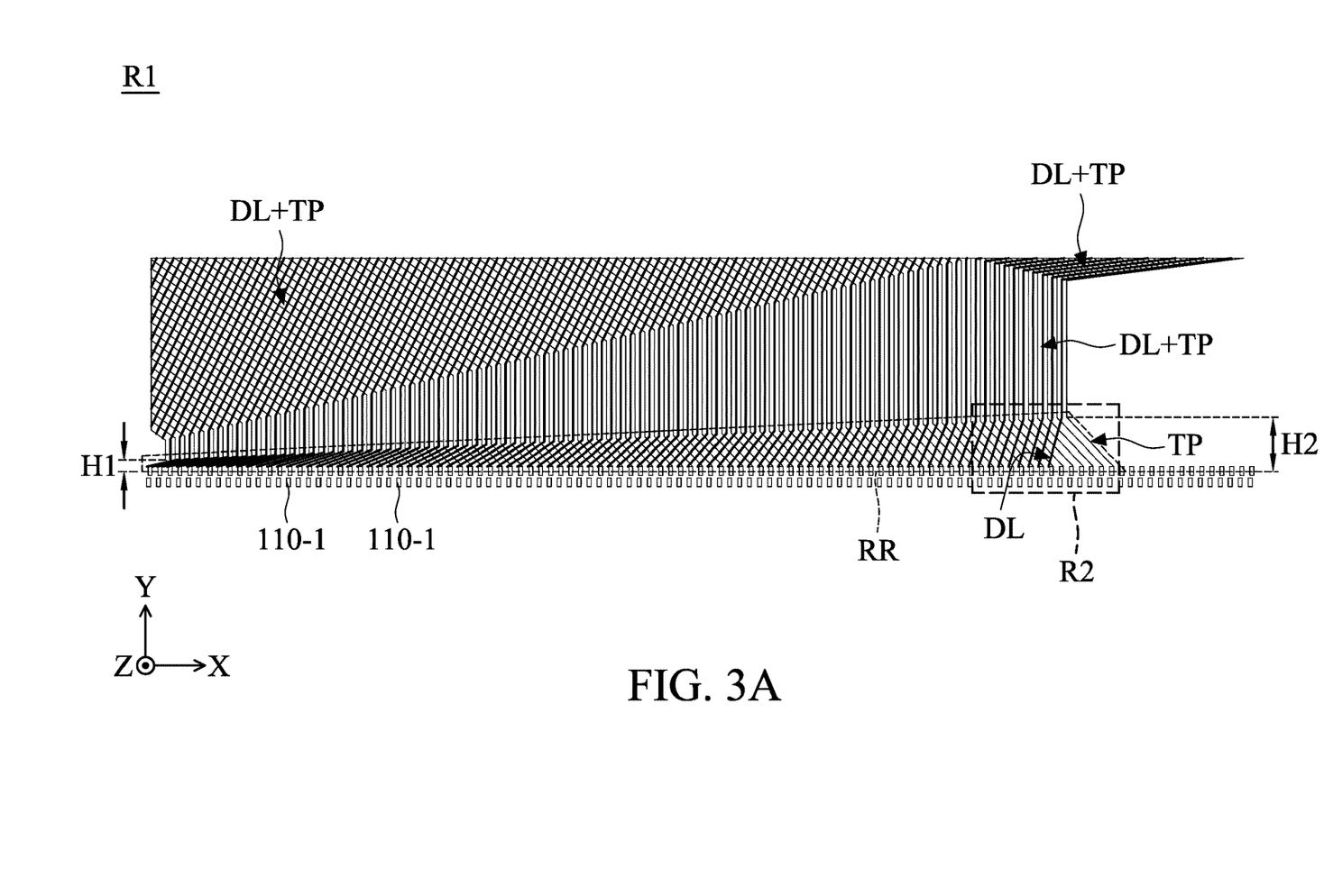
FIG. 3A is an enlarged structural diagram of region R1 of FIG. 1 in accordance with some embodiments of the present disclosure.
Figure 3B:
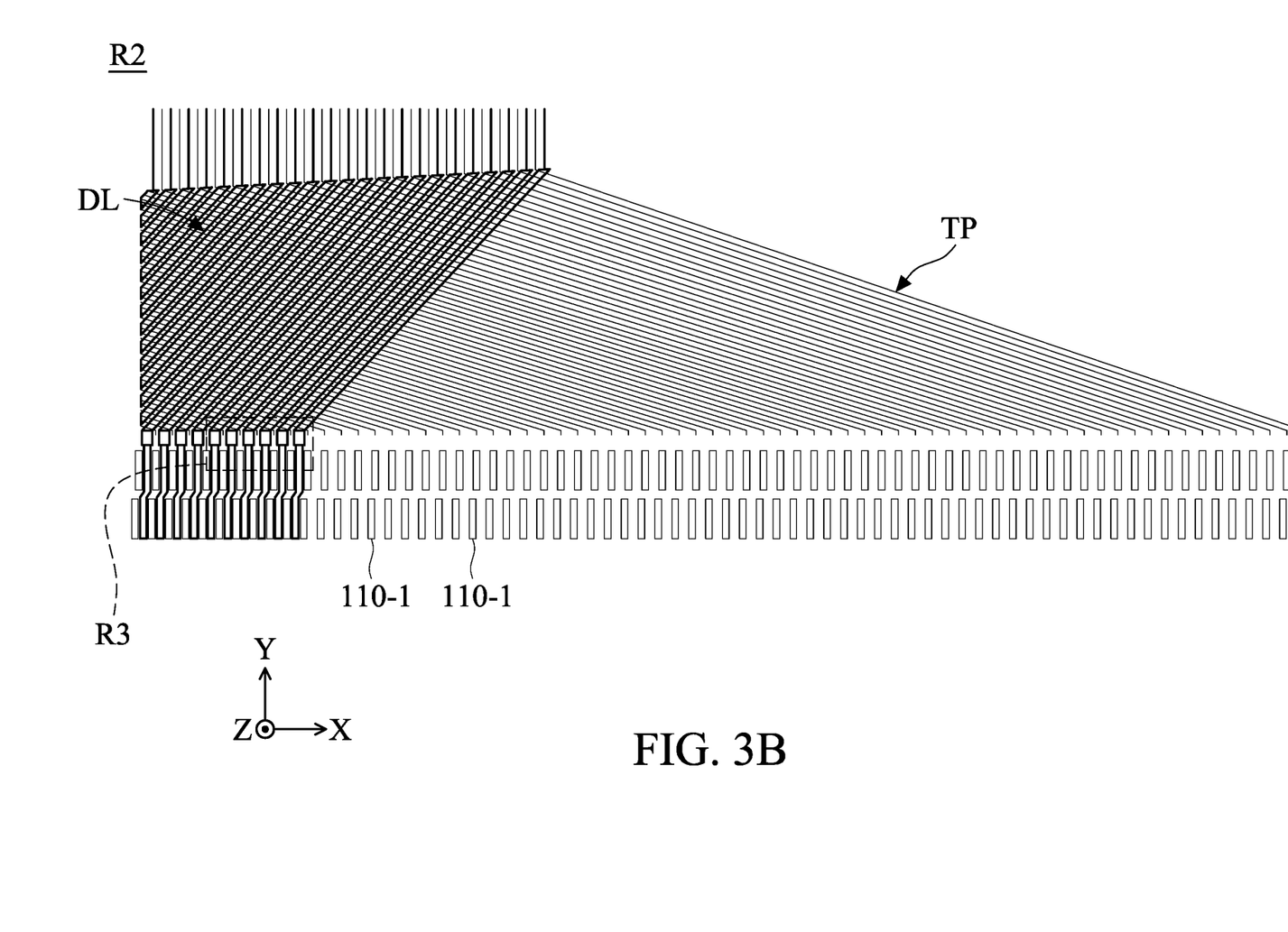
FIG. 3B is an enlarged structural diagram of region R2 of FIG. 3A in accordance with some embodiments of the present disclosure.
Figure 3C:
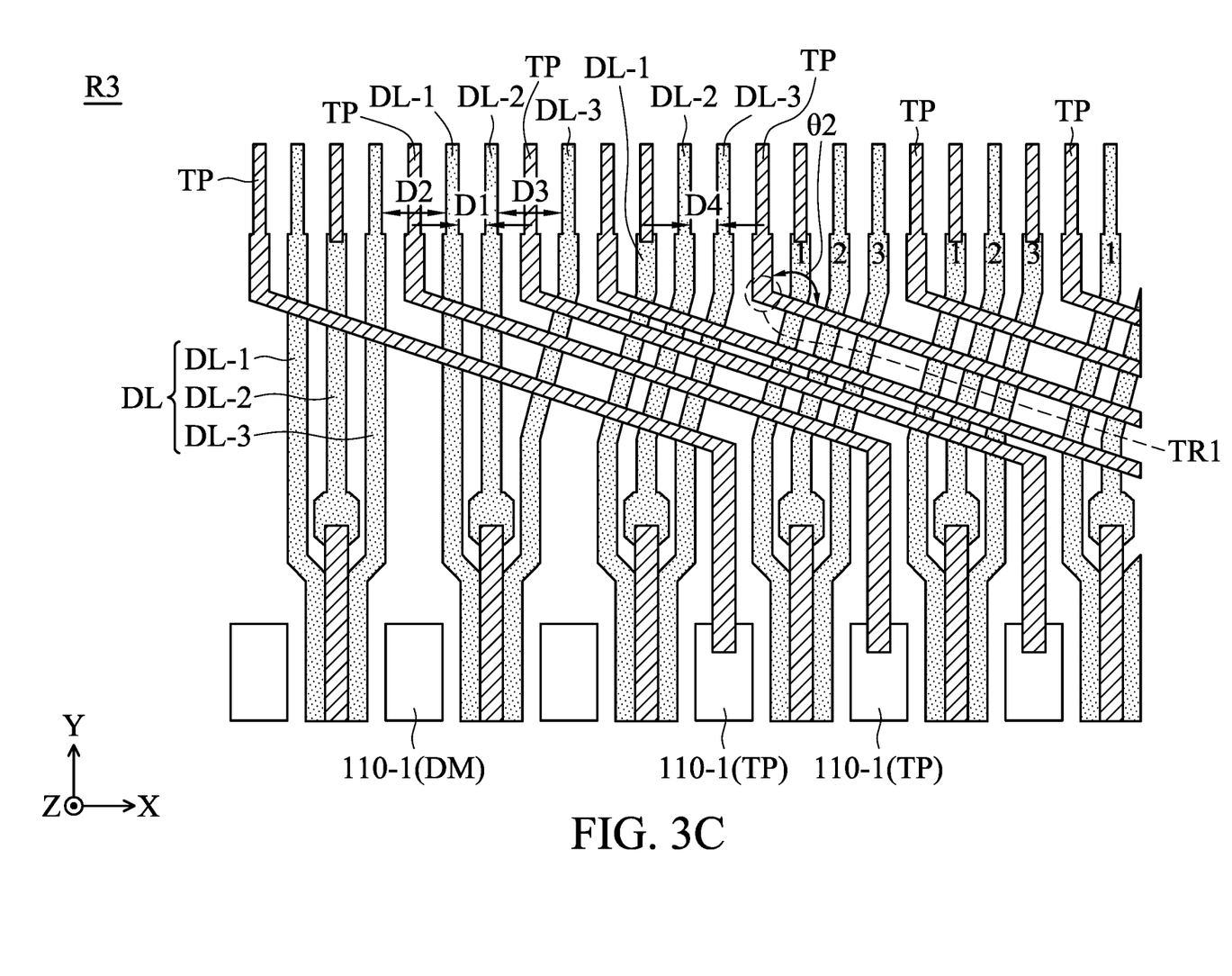
FIG. 3C is an enlarged structural diagram of region R3 of FIG. 3B in accordance with some embodiments of the present disclosure.

Refer to both FIG. 2 and FIG. 3C. The electronic device 10 may include a plurality of data lines DL (for example, a data line DL-1, a data line DL-2, and a data line DL-3) and a plurality of touch signal lines TP. The data lines DL and the touch signal lines TP may be disposed on the substrate 100, and portions of the touch signal lines TP may be disposed on the data line DL. The data lines DL may be electrically connected to at least one of the plurality of first pads 110-1 and the plurality of second pads 110-2, and the touch signal lines TP may be electrically connected to at least one of the plurality of first pads 110-1 and the plurality of second pads 110-2. Moreover, in the normal direction of the substrate 100 (for example, the Z direction in the drawing), the data line DL and the touch signal line TP at least partially overlap. In accordance with some embodiments, the data line DL-1, the data line DL-2, and the data line DL-3 are electrically connected to the sub-pixel 10a, the sub-pixel 10b, and the sub-pixel 10c, respectively. In accordance with some embodiments, the data line DL-1, the data line DL-2 and the data line DL-3 are respectively used to control the signal of the red sub-pixel, the signal of the green sub-pixel and the signal of the blue sub-pixel.

As shown in FIG. 2, in accordance with some embodiments, the first pad 110-1 (labeled as 110-1(DL) in the drawing for convenience of description) electrically connected to the data line DL is adjacent to the first pad 110-1 (labeled as 110-1(TP) for convenience of description) electrically connected to the touch signal line TP. In addition, an upper edge u1 of the first pad 110-1(DL) electrically connected to the data line DL is not aligned with an upper edge u2 of the first pad 110-1(TP) electrically connected to the touch signal line TP. In other words, in accordance with some embodiments, the adjacent first pad 110-1(DL) and first pad 110-1(TP) may be arranged in a non-horizontal manner (for example, not along the X direction in the drawing). Specifically, in accordance with some embodiments, the upper edge u1 of the first pad 110-1(DL) and the upper edge u2 of the first pad 110-1(TP) that are adjacent to each other have a height difference d1. In accordance with some embodiments, the height difference d1 is between about 1 micrometers and about 10 micrometers (1 μm≤height difference d1≤10 μm).

Similarly, in accordance with some embodiments, in the second bonding area OB2, the second pad 110-2 (labeled as 110-2(DL) in the drawing for convenience of description) electrically connected to the data line DL is adjacent to the second pad 110-2 (labeled as 110-2(TP) for convenience of description) electrically connected to the touch signal line TP. In addition, an upper edge u3 of the second pad 110-2(DL) electrically connected to the data line DL is not aligned with an upper edge u4 of the second pad 110-2(TP) electrically connected to the touch signal line TP. In other words, in accordance with some embodiments, the adjacent second pad 110-2(DL) and second pad 110-2(TP) may be arranged in a non-horizontal manner (for example, not along the X direction in the drawing). Specifically, in accordance with some embodiments, the upper edge u3 of the second pad 110-2(DL) and the upper edge u4 of the second pad 110-2(TP) that are adjacent to each other have a height difference d2. In accordance with some embodiments, the height difference d2 is between about 1 micrometers and about 10 micrometers (1 µm≤height difference d2≤10 µm).

In accordance with the embodiments of the present disclosure, the aforementioned height difference d1 refers to the minimum distance between the extension line of the upper edge u1 of the first pads 110-1(DL) and the extension line of the upper edge u2 of the adjacent first pad 110-1(TP). In accordance with the embodiments of the present disclosure, the aforementioned height difference d2 refers to the minimum distance between the extension line of the upper edge u3 of the second pad 110-2(DL) and the extension line of the upper edge u4 of the adjacent second pad 110-2(TP).

Moreover, it should be understood that, according to embodiments of the present disclosure, an optical microscope (OM), a scanning electron microscope (SEM), a film thickness profiler (α-step), an ellipsometer, a focused ion beam (FIB) microscope, a transmission electron microscope (TEM) or another suitable method may be used to measure the thickness, width, or height of each element, or the spacing or distance between elements. Specifically, in accordance with some embodiments, a scanning electron microscope may be used to obtain a cross-sectional image including the elements to be measured, and the thickness, width, or height of each element, or the spacing or distance between elements in the image can be measured.

In addition, in accordance with the embodiments of the present disclosure, the first pad 110-1(DL) electrically connected to the data line DL and the first pad 110-1(TP) electrically connected to the touch signal line TP may be arranged in a specific order, so that portions of the data lines DL overlap the touch signal lines TP in the normal direction of the substrate 100 (refer to FIG. 3C), thereby reducing the area of the wiring arrangement. As shown in FIG. 2, in accordance with some embodiments, the first pads 110-1 (DL) and the first pads 110-1 (TP) are not alternately arranged at uniform intervals.

In accordance with some embodiments, in order to make portions of the data lines DL and the touch signal lines TP overlap in the normal direction of the substrate 100, there will be a problem that the number of sub-pixels does not match the number of the touch signal lines TP. In accordance with some embodiments, in order to solve the above problems, the data lines DL and the touch signal lines TP can be arranged and allocated in a specific manner.

For example, in an exemplary embodiment, the resolution of the electronic device is 1200*2000, the total number of sub-pixels is 1200, the total number of touch signal lines TP is 1440 (30*48), the number of sub-pixels does not match the number of touch signal lines TP, and an average of 5 sub-pixels needs to be arranged with 6 touch signal lines TP, so there are 240 more touch signal lines TP. In this embodiment, two processors (for example, ICs) are used for signal processing, so one processor will have 120 more touch signal lines TP. Therefore, 120 touch signal lines TP may be arranged as a single-layer conductive layer. At the same time, in order to make the coupling of the touch signal lines TP consistent, the data line DL may be arranged as a single-layer conductive layer (for example, the first conductive layer (not labeled) disposed on the substrate 100), and the touch signal lines TP may be located in the upper conductive layer (for example, the second conductive layer (not labeled) disposed on the first conductive layer) without layer transfer (for example, transfer from the second conductive layer to the first conductive layer through a via hole). The detailed structure of the first conductive layer and the second conductive layer will be further described below. In addition, considering that the data lines DL are electrically connected to sub-pixels of different colors (for example, the data line DL-1, data line DL-2 and data line DL-3 are respectively electrically connected to the red sub-pixel, green sub-pixel and blue sub-pixel) and in the case of less impact on the visual effect, the data lines DL (for example, the data lines DL-2) controlling the green sub-pixels may be arranged as a single-layer conductive layer (for example, the first conductive layer), so that the touch signal lines TP are all located in the upper conductive layer (for example, the second conductive layer), and the 600 touch signal lines TP overlap the data lines DL (for example, the data lines DL-1) controlling the red sub-pixel, and the 120 touch signal lines TP overlap the data lines DL (for example, data line DL-3) controlling the blue sub-pixel. With the aforementioned arrangement and allocation of the data lines DL and the touch signal lines TP, the problem of mismatch between the number of sub-pixels and the number of touch signal lines TP can be solved.

Furthermore, in another exemplary embodiment, the resolution of the electronic device is 1200*1920, the total number of touch signal lines TP is 1536 (32*48), and the touch signal area can be divided into 8 of 36*40 touch signal blocks and 24 of 38*40 touch signal blocks. In the 36*40 touch signal block, 36 sub-pixels need to be matched with 48 touch signal lines TP, with an average of 4 touch signal lines TP for every 3 sub-pixels. The data lines DL (for example, data lines DL-2) controlling the green sub-pixel may be arranged as a single-layer conductive layer (for example, the first conductive layer), so that the touch signal lines TP are all located in the upper conductive layer (for example, the second conductive layer), and 36 touch signal lines TP overlap the data lines DL (for example, data line DL-1) controlling the red sub-pixel, and 12 touch signal lines TP overlap the data lines DL (for example, the data line DL-3) controlling the blue sub-pixel. In this way, the coupling conditions of the touch signal lines TP may be consistent. In the 38*40 touch signal block, 38 sub-pixels need to be matched with 48 touch signal lines TP, which are divided into 2 groups of 3 sub-pixels with 4 touch signal lines TP and 8 groups of 4 sub-pixels with 5 touch signal lines TP, and the data lines DL (for example, data line DL-2) controlling the green sub-pixel can be arranged as a single-layer conductive layer (for example, the first conductive layer), so that the touch signal lines TP are all located in the upper conductive layer (for example, the second conductive layer), and 38 touch signal lines TP overlap the data lines DL (for example, data line DL-1) controlling the red sub-pixel, and 5 touch signal lines TP overlap the data lines DL (for example, data line DL-3) controlling the blue sub-pixel, and 5 touch signal lines TP overlap the data lines DL (for example, data line DL-2) controlling the green sub-pixel overlapping. In this way, the coupling conditions of the touch signal lines TP may be consistent. With the aforementioned arrangement and allocation of the data lines DL and the touch signal lines TP, the problem of mismatch between the number of sub-pixels and the number of touch signal lines TP can be solved.

Similarly, the second pads 110-2 (DL) electrically connected to the data line DL and the second pads 110-2 (TP) electrically connected to the touch signal line TP may also be arranged in a specific order, so that portions of the data lines DL and the touch signal lines TP overlap in the normal direction of the substrate 100, thereby reducing the area of the wiring arrangement. The detailed description of the arrangement of the second pads 110-2 can refer to the above design of the first pad 110-1, and thus will not be repeated here.

It should be noted that, in accordance with the embodiments of the present disclosure, by arranging the first pads 110-1 and the second pads 110-2 in a non-horizontal manner (for example, to gradually rising upward or descending downward) and arranging the first pads 110-1 and the second pads 110-2 in a specific order (that is, arranging and allocating the data lines DL and the touch signal lines TP in a specific manner), so that the data lines DL have space for re-routing and portions of the data lines DL overlap the touch signal lines TP, thereby reducing the area of the wiring arrangement. Therefore, the area of the peripheral region can be reduced, and the narrow frame design of the electronic device can be realized.

Next, refer to FIG. 3A to FIG. 3C. FIG. 3A is an enlarged structural diagram of region R1 of FIG. 1 in accordance with some embodiments of the present disclosure. FIG. 3B is an enlarged structural diagram of region R2 of FIG. 3A in accordance with some embodiments of the present disclosure. FIG. 3C is an enlarged structural diagram of region R3 of FIG. 3B in accordance with some embodiments of the present disclosure. It should be understood that, for clarity, the region labeled as DL+TP in FIG. 3A represents the region where the data lines DL and the touch signal lines TP are alternately arranged.

As shown in FIG. 3A and FIG. 3B, in accordance with some embodiments, the data lines DL and the touch signal lines TP may be re-matched in a region RR, and the region RR may be a fan-out area of the peripheral region BA. Portions of the data lines DL overlap the touch signal lines TP, and the data lines DL and the touch signal lines TP may be connected to the first pad 110-1. In accordance with some embodiments, two sides of the region RR may have different heights. For example, one side of the region RR has a height H1, and the other side has a height H2, and the height H1 may be smaller than the height H2. In accordance with some embodiments, the height H1 may be between about 30 μm and about 300 μm (30 μm≤height H1≤300 μm), for example, 100 μm, 150 μm, 200 μm or 250 μm. In accordance with some embodiments, the height H2 may be between about 500 μm and about 3000 μm (500 μm≤height H2≤3000 μm), for example, 750 μm, 1500 μm or 2000 μm.

In accordance with the embodiments of the present disclosure, the aforementioned height H1 refers to the height of the region RR closest to a side edge e1 (referring to FIG. 1) of the substrate 100, and the aforementioned height H2 refers to the height of the region RR farthest from the side edge e1 (referring to FIG. 1) of the substrate 100. Specifically, the height H1 may be the shortest distance between the first pad 110-1 closest to the side edge e1 of the substrate 100 and the turning point of the data line DL in the region RR, or it may also be the shortest distance between the first pad 110-1 closest to the side edge e1 of the substrate 100 and the turning point of the touch signal line TP, but it is not limited thereto. The height H2 may be the shortest distance between the first pad 110-1 farthest from the side edge e1 of the substrate 100 and the turning point of the data line DL in the region RR, or it may be the shortest distance between the first pad 110-1 farthest from the side edge e1 of the substrate 100 and the turning point of the touch signal line TP, but it is not limited thereto.

Refer to FIG. 3C, which shows the detailed connection structure of the data lines DL and the touch signal lines TP (it should be understood that, for the convenience of description, the numbers 1, 2 and 3 marked on the data lines DL in the drawing represent the data line DL-1, data line DL-2 and data line DL-3 respectively). As described in the above, in accordance with some embodiments, the data line DL-1, the data line DL-2 and the data line DL-3 may be used to control the signal of the red sub-pixel, the signal of the green sub-pixel and the signal of the blue sub-pixel respectively. As shown in FIG. 3C, in accordance with some embodiments, since the data lines DL and the touch signal lines TP are arranged and allocated in a specific way, the touch signal lines TP can be disposed between the data line DL-1 and the data line DL-3, the touch signal line TP can be disposed between the data line DL-2 and the data line DL-3.

In accordance with some embodiments, a distance D1 between the data line DL-1 and the adjacent data line DL-2 is different from a distance D2 between the data line DL-1 and the adjacent data line DL-3. In accordance with some embodiments, the distance D1 between the data line DL-1 and the data line DL-2 is between about 6 micrometers and about 8 micrometers (6 μm≤distance D1≤8 μm), for example, 6.5 μm, 7 μm or 7.5 μm. In accordance with some embodiments, the distance D2 between the data line DL-1 and the adjacent data line DL-3 is between about 14 micrometers and about 18 micrometers (14 μm≤distance D2≤18 μm), for example, 14.5 μm, 15 μm, 15.5 μm, 16 μm, 16.5 μm, 17 μm or 17.5 μm.

In accordance with the embodiments of the present disclosure, the aforementioned distance D1 refers to the minimum distance between the data line DL-1 and the adjacent data line DL-2 in the direction perpendicular to the extending direction of the data line DL-1 (for example, the X direction in the drawing) in the first bonding area OB1 (or the second bonding area OB2). The aforementioned distance D2 refers to the minimum distance between the data line DL-1 and the adjacent data line DL-3 in the direction perpendicular to the extending direction of the data line DL-1 (for example, the X direction in the drawing) in the first bonding area OB1 (or the second bonding area OB2).

Moreover, in accordance with some embodiments, a distance D3 between the data line DL-2 and the data line DL-3 used to control one of the pixels 10P (referring to FIG. 1) is different from a distance D4 between the data line DL-2 and the data line DL-3 used to control the other one of the pixels 10P (referring to FIG. 1). In other words, the distances between the data line DL-2 and the data line DL-3 controlling different pixels 10P may be different. In accordance with some embodiments, the distance D3 between the data line DL-2 and the data line DL-3 controlling one of the pixels 10P is between about 14 μm and about 18 μm (14 μm≤distance D3≤18 μm), for example, 14.5 μm, 15 μm, 15.5 μm, 16 μm, 16.5 μm, 17 μm or 17.5 μm. In accordance with some embodiments, the distance D4 between the data line DL-2 and the data line DL-3 controlling the other one of the pixels 10P is between about 6 μm and about 8 μm (6 μm≤distance D4≤8 μm), for example, 6.5 μm, 7 μm, or 7.5 μm.

In accordance with the embodiments of the present disclosure, the aforementioned distance D3 and distance D4 refer to the minimum distance between the data line DL-2 and the adjacent data line DL-3 in the direction perpendicular to the extending direction of the data line DL-2 (for example, the X direction in the drawing) in the first bonding area OB1 (or the second bonding area OB2).

In addition, as described above, the electronic device 10 may include a first conductive layer (not labeled) and a second conductive layer (not labeled). The first conductive layer and the second conductive layer may be disposed on the substrate 100, and the second conductive layer may be disposed above the first conductive layer. Both the touch signal lines TP and the data lines DL (including the data lines DL-1, the data lines DL-2 and the data lines DL-3) belong to the first conductive layer or the second conductive layer. Moreover, in accordance with some embodiments, the electronic device 10 may further include an insulating layer (not illustrated) disposed between the first conductive layer and the second conductive layer, so that the first conductive layer and the second conductive layer may be electrically insulated.

In accordance with some embodiments, the materials of the first conductive layer and the second conductive layer may include metal materials, transparent conductive materials, other suitable materials or a combination thereof, but they are not limited thereto. For example, the metal material may include copper, aluminum, molybdenum, indium, ruthenium, tin, gold, platinum, zinc, silver, titanium, lead, nickel, neodymium, iridium, chromium, magnesium, palladium, lithium, alloys of the foregoing metals, another suitable metal material or a combination thereof, but it is not limited thereto. For example, the transparent conductive material may include transparent conductive oxide (TCO), such as indium tin oxide (ITO), antimony zinc oxide (AZO), tin oxide (SnO), zinc oxide (ZnO), indium zinc oxide (IZO), indium gallium zinc oxide (IGZO), indium tin zinc oxide (ITZO), antimony tin oxide (ATO), another suitable transparent conductive material, or a combination thereof, but it is not limited thereto. Furthermore, the material of the first conductive layer may be the same as or different from that of the second conductive layer.

In accordance with some embodiments, the material of the insulating layer may include an organic material, an inorganic material, another suitable material or a combination thereof, but it is not limited thereto. For example, the inorganic material may include silicon nitride, silicon oxide, silicon oxynitride, aluminum oxide, another suitable material or a combination thereof, but it is not limited thereto. For example, the organic material may include epoxy resin, silicone resin, acrylic resin (such as polymethylmetacrylate (PMMA), polyimide, perfluoroalkoxy alkane (PFA), another suitable material, or a combination thereof, but it is not limited thereto.

In accordance with some embodiments, the touch signal line TP may be disposed between the data line DL-2 and the data line DL-3, and at least portions of the data line DL-2 may belong to the first conductive layer. More specifically, in accordance with some embodiments, the touch signal line TP may be disposed between the data line DL-2 for controlling the green sub-pixel and the data line DL-3 for controlling the blue sub-pixel, and the data line DL-2 controlling the green sub-pixel may belong to the first conductive layer (some data lines DL-2 may also belong to the second conductive layer).

As shown in FIG. 3C, in accordance with some embodiments, the touch signal line TP may be connected to the first pad 110-1 across a plurality of data lines DL. In accordance with some embodiments, when the touch signal line TP crosses the plurality of data lines DL, a turning portion TR1 is formed, and the turning portion TR1 has an included angle $\theta2$. In accordance with some embodiments, the included angle $\theta2$ is between about 60 degrees and about 150 degrees (60 degrees≤included angle $\theta2$≤150 degrees), for example, 90 degrees, 110 degrees or 130 degrees.

Furthermore, in accordance with some embodiments, some of the first pads 110-1 may not be connected to the touch signal line TP or the data line DL, such first pads 110-1 (labeled as the first pad 110-1(DM) can serve as dummy pads. It should be understood that although the first pads 110-1 connected to the data line DL-1, the data line DL-2 and the data line DL-3 are not shown in FIG. 3C, the data line DL-1, the data line DL-2 and the data line DL-3 are actually connected to the first pads 110-1 respectively.

Figure 4A:
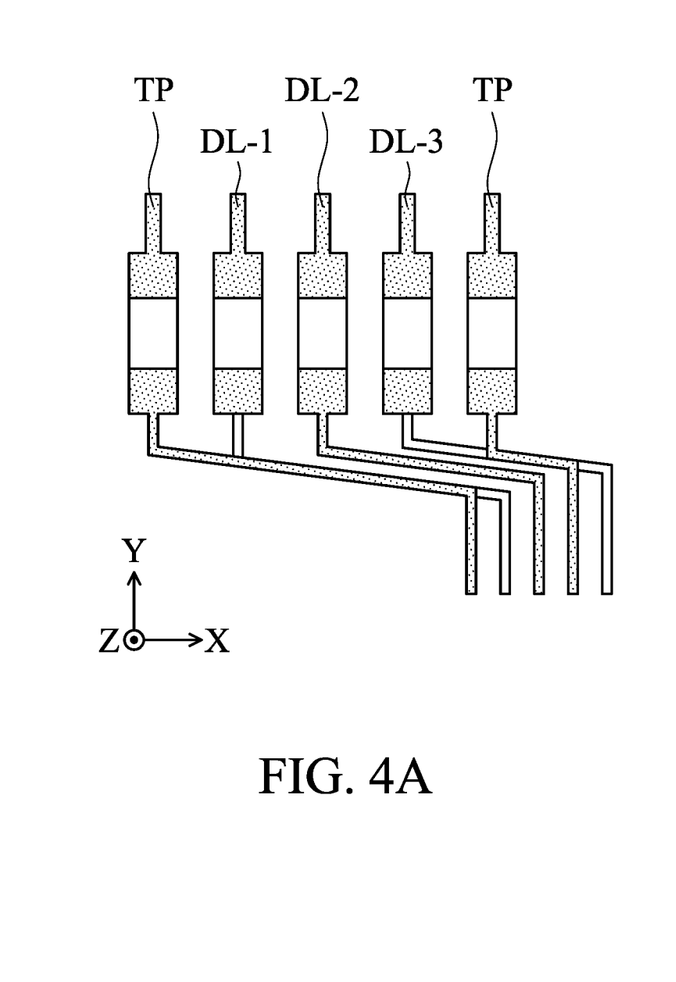
FIG. 4A is a top-view diagram of a partial structure of an electronic device in accordance with some embodiments of the present disclosure.
Figure 4B:
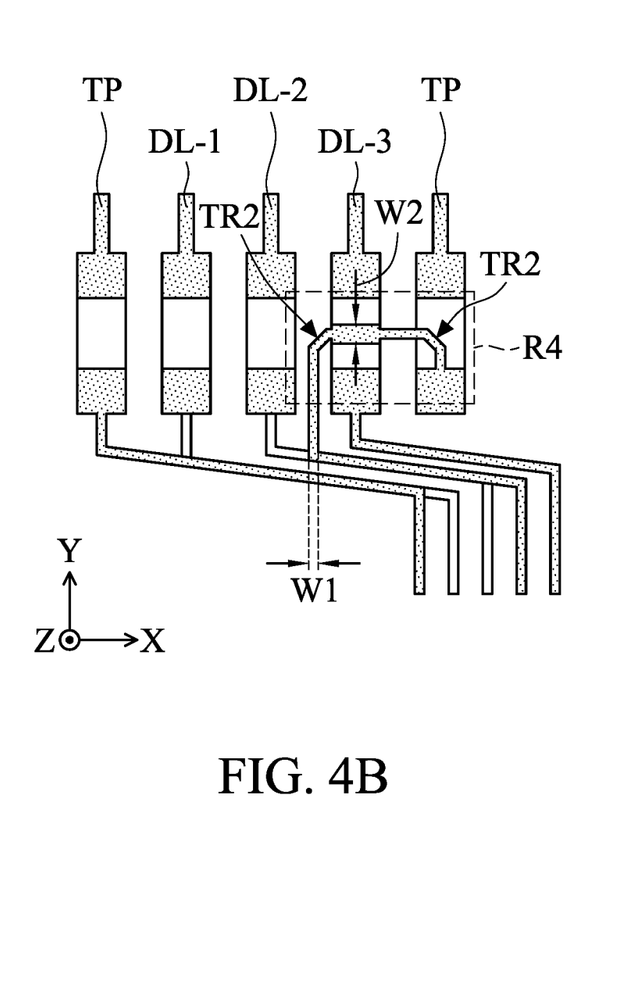
FIG. 4B is a top-view diagram of a partial structure of an electronic device in accordance with some embodiments of the present disclosure.
Figure 4C:
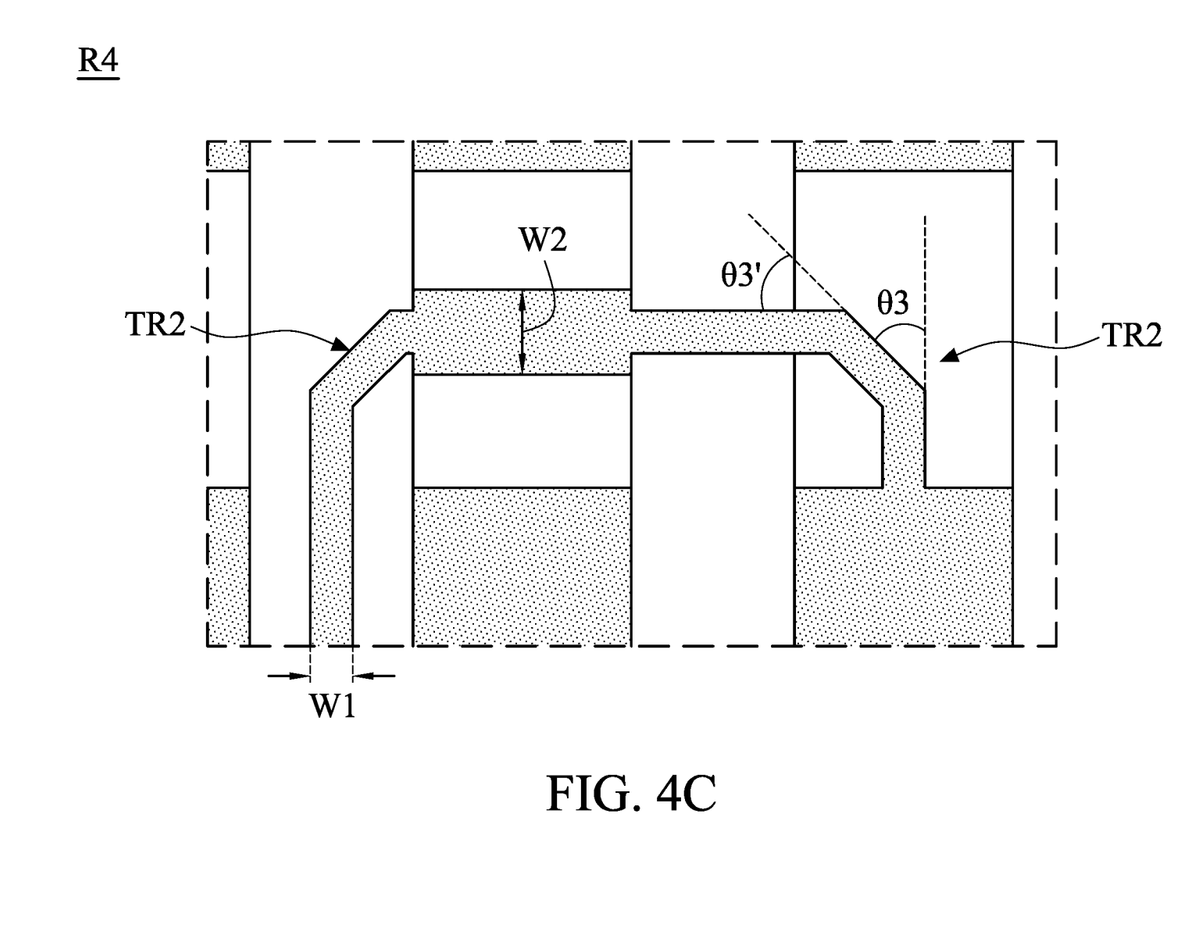
FIG. 4C is an enlarged structural diagram of region R4 of FIG. 4B in accordance with some embodiments of the present disclosure.

Next, refer to FIG. 4A to FIG. 4C. FIG. 4A and FIG. 4B are top-view diagrams of a partial structure of the electronic device 10 in accordance with some embodiments of the present disclosure. FIG. 4C is an enlarged structural diagram of region R4 of FIG. 4B in accordance with some embodiments of the present disclosure. It should be understood that FIG. 4A and FIG. 4B only show the touch signal lines TP, the data lines DL-1, the data lines DL-2 and the data lines DL-3 of the electronic device 10, so as to clearly illustrate their wiring aspects.

As shown in FIG. 4A, in accordance with some embodiments, the touch signal line TP, the data line DL-1, the data line DL-2, and the data line DL-3 all have turning portions (not labeled), and the touch signal line TP may partially overlap the data line DL-1 and the data line DL-3 in the normal direction of the substrate 100 (for example, the Z direction in the drawing).

As shown in FIG. 4B, in accordance with some embodiments, the touch signal line TP is adjacent to the data line DL-3, and the touch signal line TP can cross the data line DL-3 and overlap the data line DL-2 in the normal direction of the substrate 100. In addition, the data line DL-2 belongs to the second conductive layer. Moreover, in accordance with some embodiments, the portion of the touch signal line TP crossing the data line DL-3 has a width of W2, while the portion of the touch signal line TP not crossing the data line DL-2 has a width of W1, and width W2 may be greater than width W1. In other words, width W2 of the touch signal line TP in the crossing line region may be greater than width W1 of the non-crossing line region. In accordance with some embodiments, the difference between width W2 and width W1 may be between about 0.5 μm and about 3 μm (0.5 μm≤width W2−width W1≤3 μm), for example, 1 μm, 1.5 μm, 2 μm or 2.5 μm. In accordance with some other embodiments, the width W2 may be substantially equal to the width W1, but it is not limited thereto.

It should be noted that when the width W2 of the touch signal line TP in the crossing line region is larger than the width W1 of the non-crossing line region, the risk of breaking the touch signal line TP in the crossing line region can be reduced and the reliability of the circuit structure can be improved.

As shown in FIG. 4B and FIG. 4C, in accordance with some embodiments, the touch signal line TP may have at least two turning portions TR2, and one turning portion TR2 may have a turning angle $\theta3$ and a turning angle $\theta3'$. The turning angle $\theta3$ and the turning angle $\theta3'$ may be between about 30 degrees and about 60 degrees (30 degrees≤turning angle≤60 degrees), for example, 35 degrees, 40 degrees, 45 degrees, 50 degrees or 55 degrees. Furthermore, in accordance with some embodiments, the turning portion TR2 may have an arc-shaped corner.

It should be noted that the touch signal line TP having the turning portion TR2 can reduce the occurrence of ESD damage caused by corona discharge and improve the reliability of the circuit structure.

To summarize the above, in accordance with the embodiments of the present disclosure, the electronic device has data lines and touch signal lines configured in a specific wiring manner. For example, by rearranging pads, overlapping data lines and touch signal lines, etc., the numbers of the data lines and the touch signal lines are respectively matched with the pixels, so as to reduce the wiring configuration area of the fan-out area, thereby reducing the area of the peripheral region, and realizing the narrow frame design of the electronic device.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Thus, the appended claims are intended to include within their scope such processes, machines, manufacture, compositions of matter, means, methods or steps. Moreover, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
   a substrate having a first bonding area and a second bonding area;
   a plurality of first pads disposed in the first bonding area and arranged along a first direction;
   a plurality of second pads disposed in the second bonding area and arranged along a second direction, wherein there is an included angle between the first direction and the second direction;
   a first data line disposed on the substrate and electrically connected to at least one of the plurality of first pads or the plurality of second pads;
   a touch signal line disposed on the substrate and electrically connected to at least another one of the plurality of first pads or the plurality of second pads; and
   a plurality of pixels, a second data line and a third data line, wherein the plurality of pixels, the second data line and the third data line are disposed on the substrate, and at least one of the plurality of pixels comprises a red sub-pixel, a green sub-pixel and a blue sub-pixel, wherein the first data line, the second data line and the third data line respectively control a signal of the red sub-pixel, a signal of the green sub-pixel, and a signal of the blue sub-pixel;
   wherein the first data line at least partially overlaps the touch signal line, the touch signal line crosses the third data line and overlaps the second data line, and a width of a portion of the touch signal line crossing the third data line is greater than a width of a portion of the touch signal line not crossing the third data line.

2. The electronic device as claimed in claim 1, wherein one of the plurality of first pads electrically connected to the first data line is adjacent to another one of the plurality of first pads electrically connected to the touch signal line, and an upper edge of the one of the plurality of first pads electrically connected to the first data line is not aligned with an upper edge of the another one of the plurality of first pads electrically connected to the touch signal line.

3. The electronic device as claimed in claim 1, wherein a distance between the first data line and the second data line is different from a distance between the second data line and the third data line.

4. The electronic device as claimed in claim 3, wherein the distance between the first data line and the second data line is between 6 micrometers and 8 micrometers.

5. The electronic device as claimed in claim 3, wherein the distance between the second data line and the third data line is between 14 micrometers and 18 micrometers.

6. The electronic device as claimed in claim 1, wherein a first distance between the second data line and the third data line for controlling one of the plurality of pixels is different from a second distance between the second data line and the third data line for controlling another one of the plurality of pixels.

7. The electronic device as claimed in claim 6, wherein the first distance is between 14 micrometers and 18 micrometers.

8. The electronic device as claimed in claim 6, wherein the second distance is between 6 micrometers and 8 micrometers.

9. The electronic device as claimed in claim 1, wherein the touch signal line is disposed between the second data line and the third data line.

10. The electronic device as claimed in claim 1, wherein the portion of the touch signal line crosses the third data line and forms a turning portion, and an included angle of the turning portion is between 60 degrees and 150 degrees.

11. The electronic device as claimed in claim 1, further comprising a first conductive layer and a second conductive layer disposed on the substrate, wherein the second conductive layer is disposed above the first the first conductive layer.

12. The electronic device as claimed in claim 11, wherein the second data line belongs to the second conductive layer.

13. The electronic device as claimed in claim 11, wherein the touch signal line is disposed between the second data line and the third data line, and at least a portion of the second data line belongs to the first conductive layer.

14. The electronic device as claimed in claim 11, wherein the touch signal line has at least two turning portions, and the at least two turning portion each is between 30 degrees and 60 degrees.

15. The electronic device as claimed in claim 14, wherein the at least two turning portions have an arc-shaped corner.

16. The electronic device as claimed in claim 1, wherein some of the plurality of first pads are not connected to the touch signal line and serve as dummy pads.

17. The electronic device as claimed in claim 1, wherein the plurality of first pads and the plurality of second pads are arranged in a non-horizontal manner.

\* \* \* \* \*